United States Patent
Sim

(10) Patent No.: US 10,445,596 B2
(45) Date of Patent: Oct. 15, 2019

(54) CAMERA DEVICE FOR VEHICLE

(71) Applicant: MANDO CORPORATION, Pyeongtaek-si, Gyeonggi-do (KR)

(72) Inventor: Sang Kyun Sim, Anyang-si (KR)

(73) Assignee: MANDO CORPORATION, Pyeongtaek-si, Gyeonggi-Do (KR)

(*) Notice: Subject to any disclaimer, the term of this patent is extended or adjusted under 35 U.S.C. 154(b) by 413 days.

(21) Appl. No.: 15/216,693

(22) Filed: Jul. 22, 2016

(65) Prior Publication Data
US 2017/0032197 A1 Feb. 2, 2017

(30) Foreign Application Priority Data
Jul. 29, 2015 (KR) .................. 10-2015-0107054

(51) Int. Cl.
*B60R 11/04* (2006.01)
*B60R 1/00* (2006.01)
*G06K 9/00* (2006.01)

(52) U.S. Cl.
CPC ............ *G06K 9/00805* (2013.01); *B60R 1/00* (2013.01); *B60R 11/04* (2013.01); *B60R 2300/301* (2013.01); *B60R 2300/602* (2013.01); *G06K 9/00798* (2013.01); *G06T 2207/30252* (2013.01)

(58) Field of Classification Search
CPC .................................................. G06K 9/00805
USPC ......................................................... 348/148
See application file for complete search history.

(56) References Cited

U.S. PATENT DOCUMENTS

| | | | | |
|---|---|---|---|---|
| 8,305,431 B2* | 11/2012 | Robert | ...................... | G06T 7/97 348/47 |
| 9,221,396 B1* | 12/2015 | Zhu | ......................... | B60Q 9/008 |
| 9,248,834 B1* | 2/2016 | Ferguson | .............. | B60W 30/09 |
| 9,555,740 B1* | 1/2017 | Zhu | ......................... | B60Q 9/008 |
| 2005/0083405 A1* | 4/2005 | Imoto | ...................... | B60R 1/00 348/148 |
| 2009/0303026 A1* | 12/2009 | Broggi | .................. | G01S 17/023 340/435 |
| 2010/0104199 A1* | 4/2010 | Zhang | ................ | G06K 9/00798 382/199 |
| 2014/0168377 A1* | 6/2014 | Cluff | .................... | H04N 13/246 348/47 |
| 2015/0103159 A1* | 4/2015 | Shashua | ............. | G06K 9/00798 348/118 |

(Continued)

Primary Examiner — Christopher S Kelley
Assistant Examiner — Asmamaw G Tarko
(74) Attorney, Agent, or Firm — Hauptman Ham, LLP

(57) ABSTRACT

The present disclosure relates to a camera device of a vehicle, including at least: a first image generating unit that photographs a first area, which includes a first sub-area and a second sub-area, and generates a first image that includes a first sub-image associated with the first sub-area and a second sub-image associated with the second sub-area; a second image generating unit that photographs a second area, which includes the second sub-area and a third sub-area, and generates a second image that includes a third sub-image associated with the second sub-area and a fourth sub-image associated with the third sub-area; and an image analyzing unit that recognizes a first forward object by analyzing the first sub-image, recognizes a lateral object by analyzing the fourth sub-image, recognizes a second forward object by analyzing the second sub-image and the third sub-image, and measures a distance to the second forward object.

11 Claims, 16 Drawing Sheets

(56) References Cited

U.S. PATENT DOCUMENTS

| | | | | |
|---|---|---|---|---|
| 2015/0160340 A1* | 6/2015 | Grauer | ............... | G01S 17/89 |
| | | | | 356/5.04 |
| 2015/0165972 A1* | 6/2015 | Takemae | ............ | G06K 9/00805 |
| | | | | 348/148 |
| 2015/0199577 A1* | 7/2015 | Kim | ............... | G06K 9/00798 |
| | | | | 348/148 |
| 2015/0298621 A1* | 10/2015 | Katoh | ............... | B60R 11/04 |
| | | | | 348/148 |
| 2015/0375784 A1* | 12/2015 | Ogawa | ............... | B62D 15/025 |
| | | | | 701/41 |
| 2017/0310952 A1* | 10/2017 | Adomat | ............... | G02B 13/06 |

\* cited by examiner

CAMERA DEVICE FOR VEHICLE

CROSS REFERENCE TO RELATED APPLICATION

This application claims priority from Korean Patent Application No. 10-2015-0107054, filed on Jul. 29, 2015, which is hereby incorporated by reference for all purposes as if fully set forth herein.

BACKGROUND OF THE INVENTION

1. Field of the Invention

The present invention relates to a camera device of a vehicle. Particularly, the present invention relates to a camera device of a vehicle, which includes two or more lens.

2. Description of the Prior Art

Recently, vehicles contain and use image sensor-based cameras, and the cameras may be installed in the front, the back, or the like of a vehicle and may photograph images around the vehicle. The images may simply provide image information to a driver. However, through secondary analysis, the images may be used by being linked with various systems, which automatically control the driving of a vehicle or provide a driver with a warning.

The systems include an active cruise control (ACC) system, a lane change assistance system, a lane departure warning system, a forward collision warning (FCW) system, and a parking assistance system, or the like.

A lens used for a camera has a predetermined angle of field and a predetermined focal length, and an area photographed by the camera may be limited by the angle of field and the focal length. Accordingly, a system that obtains an image through a camera having a predetermined angle of field may have a predetermined limitation. For example, in the case of a camera that employs a lens with a narrow angle of field and a long focal length for photographing a long-distance image, the right-and-left width of a photographed area is narrow. A system that obtains an image through the camera may not normally recognize an object existing in the lateral side, which is a limitation of the system. As another example, in the case of a camera that employs a lens with a wide angle of field and a short focal length for photographing a wide right-and-left area, the forward length of the photographed area is short. A system that obtains an image through the camera may not normally recognize an object located at a long distance, which is a limitation of the system.

SUMMARY OF THE INVENTION

In this background, an aspect of the present invention is to provide a camera device technology that obtains at least two images, of which photographed areas are different, by using at least two lens having different angles of field or different focal lengths.

To achieve the above, in accordance with an aspect of the present invention, there is provided a camera device of a vehicle, including: a first image generating unit that photographs a first area, which includes a first sub-area and a second sub-area, through a first lens that has a first angle of field and a first focal length, and generates a first image that includes a first sub-image associated with the first sub-area and a second sub-image associated with the second sub-area; a second image generating unit that photographs a second area, which includes the second sub-area and a third sub-area through a second lens that has a second angle of field and a second focal length, and generates a second image that includes a third sub-image associated with the second sub-area and a fourth sub-image associated with the third sub-area; and an image analyzing unit that recognizes a first forward object by analyzing the first sub-image, recognizes a lateral object by analyzing the fourth sub-image, recognizes a second forward object by analyzing the second sub-image and the third sub-image, and measures a distance to the second forward object.

As described above, according to the present invention, a camera device may obtain at least two images of which photographed areas are different, and the object recognition area of a system that uses an image photographed by a camera may become wide.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
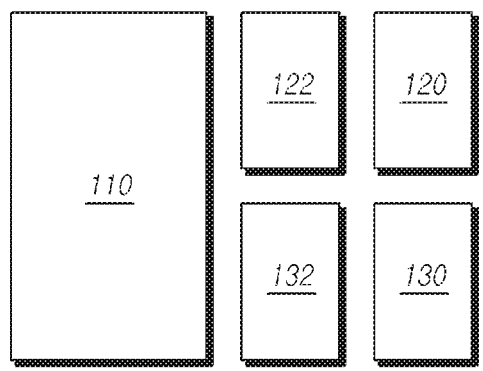
FIG. 1 is a diagram illustrating a camera device according to an embodiment of the present invention.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled"

or "joined" to another component, a third component may be "connected," "coupled," and "joined" between the first and second components, although the first component may be directly connected, coupled or joined to the second component.

FIG. 1 is a diagram illustrating a camera device according to an embodiment of the present invention.

Referring to FIG. 1, a camera device 100 includes a first lens 120, a second lens 130, a first image generating unit 122, a second image generating unit 132, an image analyzing unit 110, and the like.

The first lens 120 may have a first angle of field and a first focal length, and the second lens 130 may have a second angle of field and a second focal length. In this instance, the first lens 120 and the second lens 130 may have different angles of field. For example, the first angle of field of the first lens 120 may be narrower than the second angle of field of the second lens 130. Also, the first lens 120 and the second lens 130 may have different focal lengths. For example, the first focal length of the first lens 120 may be longer than the second focal length of the second lens 130.

A lens having a wide angle of field may have a short focal length, and a lens having a narrow angle of field may have a long focal length. This is merely an example in the generality of cases, and all of the lens may not be limited to the cases. Hereinafter, descriptions will be provided based on a case that employs a general lens. Accordingly, hereinafter, the descriptions will be provided from the perspective of an example in which the first angle of field of the first lens 120 is narrower than the second angle of field of the second lens 130, and the first focal length of the first lens 120 is longer than the second focal length of the second lens 130.

The first image generating unit 122 generates a first image based on an incident light that is input through the first lens 120. The first image may be digital image data, which includes a plurality of pixels including color information or grayscale information.

The second image generating unit 132 generates a second image based on an incident light that is input through the second lens 130. The second image may be digital image data, which includes a plurality of pixels including color information or grayscale information.

The image analyzing unit 110 may analyze the first image and the second image, and may recognize an object around a vehicle. Also, the image analyzing unit 110 may further generate additional information, such as distance information of an object, movement direction information of an object, speed information of an object, and the like, based on information associated with the recognized object.

The first image generating unit 122 may generate the first image by using the first lens 120 having the first angle of field and the first focal length, and the second image generating unit 132 may generate the second image by using the second lens 130 having the second angle of field and the second focal length, and thus, the photographed areas of the first image generating unit 122 and the second image generating unit 132 may be different.

Figure 2:
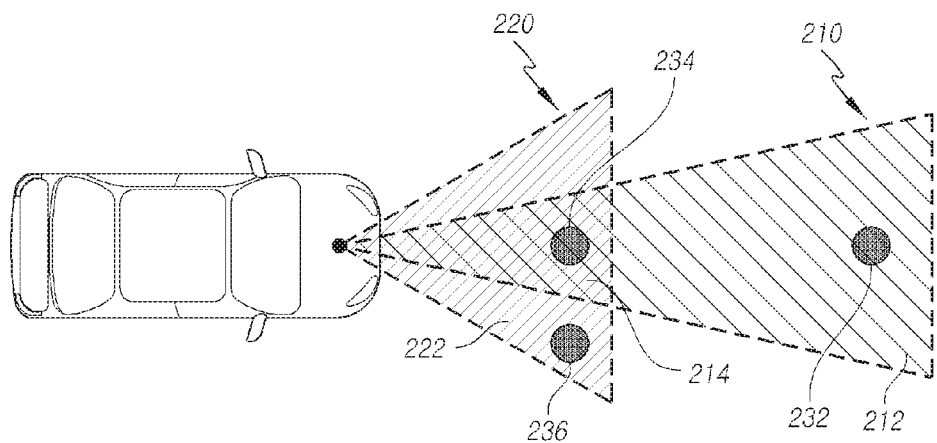
FIG. 2 is a diagram illustrating photographed areas of a first image generating unit and a second image generating unit.

FIG. 2 is a diagram illustrating photographed areas of a first image generating unit and a second image generating unit.

Referring to FIG. 2, the first image generating unit 122 generates a first image by photographing a first area 210, and the second image generating unit 132 generates a second image by photographing a second area 220.

The focal length of the first lens 120 is longer than the focal length of the second lens 130, and thus, the forward length of the first area 210 may be longer than the forward length of the second area 220. Also, the angle of field of the second lens 130 is wider than the angle of field of the first lens 120, and thus, the right-and-left width of the second area 220 may be wider than the right-and-left width of the first area 210.

The first area 210 may include a first sub-area 212 and a second sub-area 214. Substantially, the first area 210 may be formed of the first sub-area 212 and the second sub-area 214. Depending on an embodiment, the first area 210 may further include another sub-area.

The second area 220 may include a second sub-area 214 and a third sub-area 222. Substantially, the second area 220 may be formed of the second sub-area 214 and the third sub-area 222. Depending on an embodiment, the second area 220 may further include another sub-area.

The second sub-area 214 may be a common area that is included in both the first area 210 and the second area 220. Accordingly, an image associated with the second sub-area 214 may be included in the first image, and an image associated with the second sub-area 214 may be included in the second image. Particularly, the first image generating unit 122 may generate the first image that includes a first sub-image associated with the first sub-area 212 and a second sub-image associated with the second sub-area 214, and the second image generating unit 132 may generate the second image that includes a third sub-image associated with the second sub-area 214 and a fourth sub-image associated with the third sub-area 222.

The image analyzing unit 110 may recognize a first forward object 232 by analyzing the first sub-image that is obtained by photographing the first sub-area 212. The image analyzing unit 110 may recognize a lateral object 236 by analyzing the fourth sub-image that is obtained by photographing the third sub-area 222.

The first forward object 232 may be located at a long distance from a vehicle. For example, the first forward object 232 may be located at least 200 meters forward from the vehicle. The camera device 100 may use a telephoto lens, of which the focal length is long, as the first lens 120, and thus, may recognize the first forward object 232 that is located in an area that is far away from the vehicle.

The lateral object 236 may be located in the right and left areas of the vehicle. The camera device 100 may use a wide lens, of which the angle of field is wide, as the second lens 130, and thus, may recognize the lateral object 236 that is located in the right and left areas of the vehicle.

When a single lens, of which the angle of field and the focal length are predetermined, is used, as described above, the first forward object 232 that is located at a long distance and the lateral object 236 that is located in a lateral side may not be recognized at the same time. Conversely, the camera device 100 according to an embodiment of the present invention may use two lenses 120 and 130 having different angles of field or different focal lengths, and thus, may simultaneously recognize the first forward object 232 that is located at a long distance and the lateral object 236 that is located in a lateral side.

The image analyzing unit 110 may recognize a second forward object 234 by analyzing the second sub-image and the third sub-image that are obtained by photographing the second sub-area 214. The image analyzing unit 110 may measure the distance to the second forward object 234 by analyzing the second sub-image and the third sub-image. When the camera device 100 analyzes two images that are photographed in different locations, the camera device 100 may measure the distance to an object recognized through the corresponding images. The camera device 100 according to an embodiment of the present invention generates a second sub-image by photographing the second forward object 234 that is located in the second sub-area 214 using the first lens 120, and generates a third sub-image by photographing the same second forward object 234 using the second lens 130. Accordingly, the camera device 100 may obtain two images (the second sub-image and the third sub-image) associated with the second forward object 234, and may measure the distance to the second forward object 234 by analyzing the two images (the second sub-image and the third sub-image).

The image analyzing unit 110 may recognize the second forward object 234 by analyzing the second sub-image obtained by photographing the second sub-area 214, and may verify the recognition of the second forward object 234 by analyzing the third sub-image obtained by photographing the same second sub-area 214. Conversely, the image analyzing unit 110 may recognize the second forward object 234 by analyzing the third sub-image obtained by photographing the second sub-area 214, and may verify the recognizing of the second forward object 234 by analyzing the second sub-image obtained by photographing the same second sub-area 214. Through the verification, the image analyzing unit 110 may improve the reliability of the recognition of the second forward object 234.

As described above, the camera device 100 may use two lenses 120 and 130 having different angles of field and different focal lengths, and thus, may widen the object recognition area, may measure the distance of an object located in a common area, and may improve the reliability of the recognition of an object that is located in the common area.

The object recognized by the camera device 100 may be a vehicle, or all objects located around a vehicle, such as a traffic lane, an obstacle, a pedestrian, a traffic light, or the like.

Figure 3:
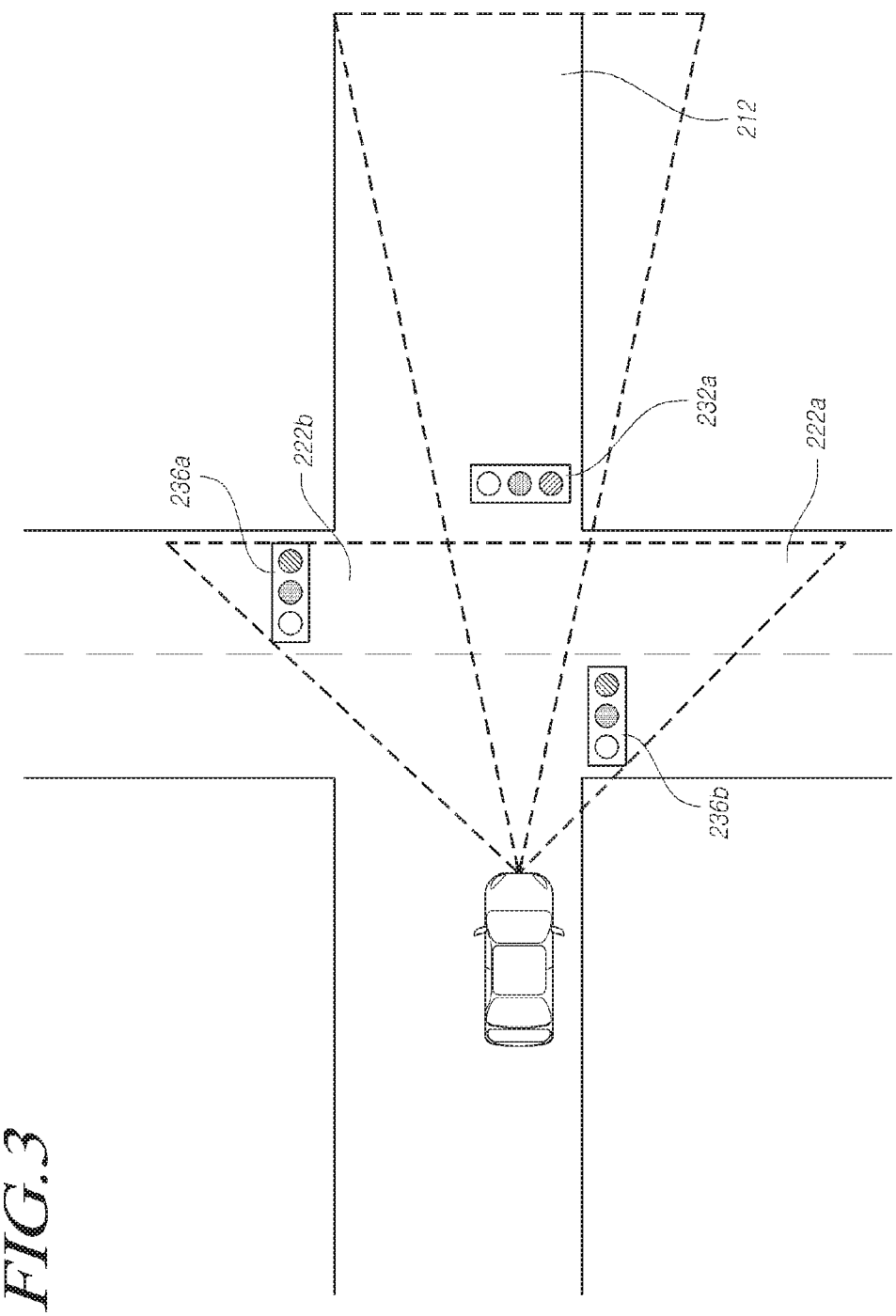
FIG. 3 is a diagram illustrating an example in which a camera device recognizes a traffic light at a crossroad according to an embodiment of the present invention.
Figure 4:
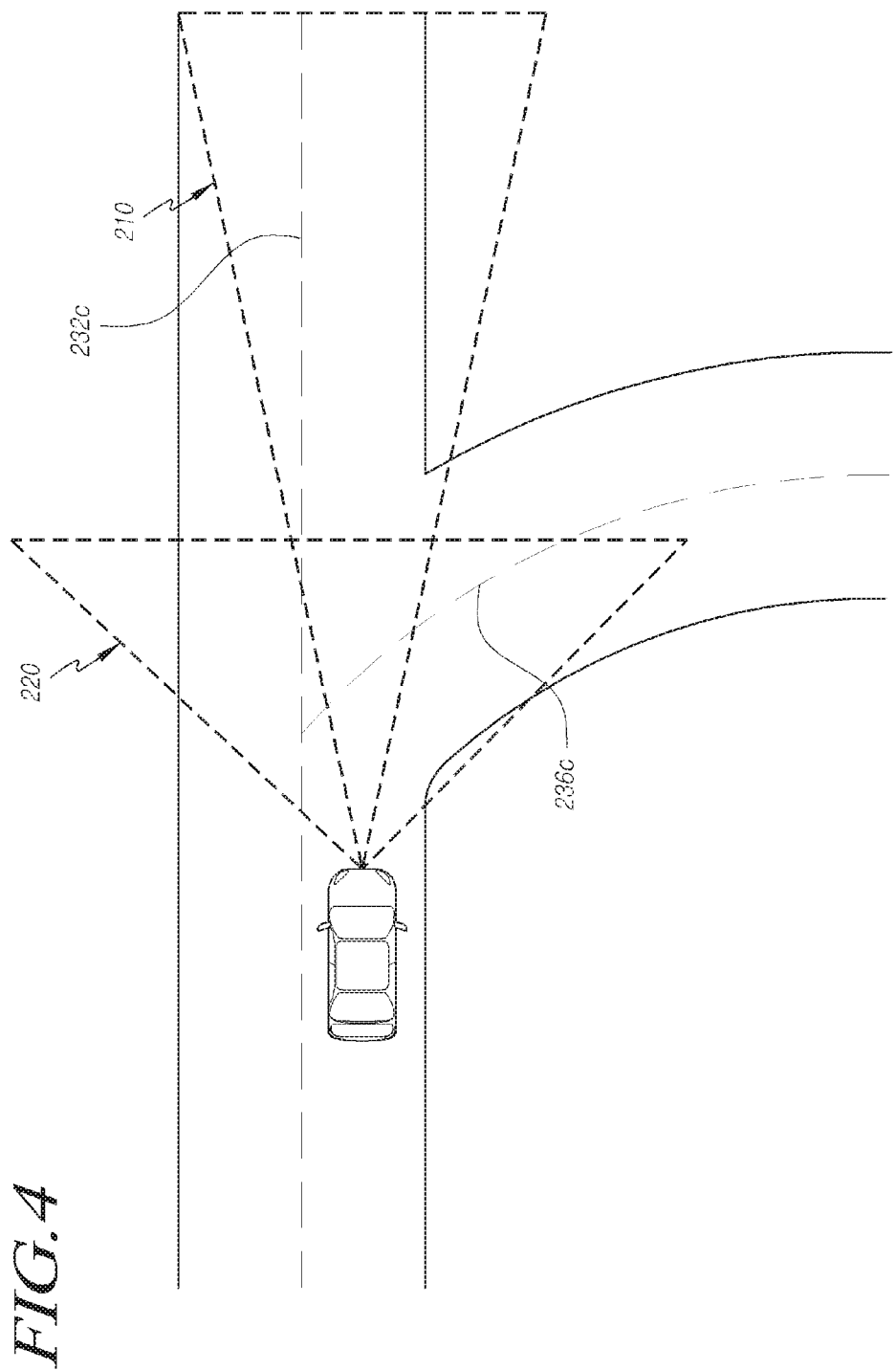
FIG. 4 is a diagram illustrating an example in which a camera device recognizes a traffic lane at a fork according to an embodiment of the present invention.

Descriptions will be provided with reference to FIGS. 3 and 4, based on an embodiment in which an object is a traffic light and an embodiment in which an object is a traffic lane.

FIG. 3 is a diagram illustrating an example in which a camera device recognizes a traffic light at a crossroad according to an embodiment of the present invention.

Referring to FIG. 3, the camera device 100 may recognize a forward traffic light 232a by analyzing a first sub-image obtained by photographing the first sub-area 212. Also, the camera device 100 may recognize a lateral traffic light 236a and 236b by analyzing a fourth sub-image obtained by photographing the third sub-area 222a and 222b. As described above, the camera device 100 may recognize all of the traffic lights 232a, 236a, and 236b located in the forward, leftward, and rightward directions of a crossroad.

FIG. 4 is a diagram illustrating an example in which a camera device recognizes a traffic lane at a fork according to an embodiment of the present invention.

Referring to FIG. 4, the camera device 100 photographs the first area 210 using the first lens 120 of which the focal length is long, and may recognize a first lane 232c by analyzing a first image photographed in the first area 210. In this instance, the curvature of the first lane 232 may be less than or equal to a predetermined value. For example, the first lane 232c may be a straight traffic lane. As the focal length of the first lens 120 becomes longer, a photographed area becomes longer in the forward direction. Accordingly, the camera device 100 may obtain the image of an area that is stretched forward. The camera device 100 may recognize a traffic lane having low curvature using the image of the long stretch in the forward direction.

The camera device 100 photographs the second area 220 using the second lens 130 of which the angle of field is wide, and may recognize a second lane 236c by analyzing a second image photographed in the second area 220. In this instance, the curvature of the second lane 236c may be greater than or equal to a predetermined value. For example, the second lane 236c may be a curvy lane. As the angle of field of the second lens 130 becomes wider, a photographed area becomes wider in the lateral direction. Accordingly, the camera device 100 may obtain the image of an area that is extended in the lateral direction. The camera device 100 may recognize a traffic lane having a high curvature using the image of the area that is extended in the lateral direction.

Traffic light information or traffic lane information that is recognized by the camera device 100 may be transmitted to another apparatus or system, and may be used for controlling a vehicle.

The vehicle may include a plurality of control devices that use image information. Particularly, the vehicle may include a system that uses traffic lane information recognized by the camera device 100. For example, a system, such as a lane departure warning system (LDWS), a lane keeping assist system (LKAS), and the like may be contained in the vehicle, and the system may warn of a lane departure or may assist in keeping a lane, based on the traffic lane information recognized through the camera device 100. Also, the vehicle may include a system that uses obstacle information recognized by the camera device 100. For example, a system, such as a collision avoidance system (CAS), a cross traffic assist system (CTA), and the like may be contained in the vehicle, and the system may prevent or warn of the collision of a vehicle, based on the obstacle information recognized through the camera device 100. Also, a brake control system (e.g., automatic emergency brake (AEB)), a cruise control system (e.g., smart cruise control (SCC)), or the like may be contained in the vehicle. The system may control the vehicle or control cruising driving based on object information or object distance information recognized through the camera device 100.

The camera device 100 may transmit, to a brake control system or cruise control system, recognition information associated with a first forward object (e.g., the object 232 of FIG. 2) and a second forward object (e.g., the object 234 of FIG. 2), and distance information associated with the second forward object 234. The brake control system or the cruise control system may perform control using the information. For example, the brake control system may recognize that an obstacle exists in a first sub-area (e.g., the sub-area 212 of FIG. 2) located in the forward direction, based on the recognition information associated with the first forward object 232. The brake control system may determine the distance between the vehicle and an obstacle located in the second sub-area (e.g., the sub-area 214 of FIG. 2), based on the recognition information and the distance information associated with the second forward object 234, and may concretely determine a braking point and the intensity of braking.

Various detection schemes using the camera device 100 of the present invention, and a vehicle controlling method using the same will be described in detail with reference to FIG. 9.

Information recognized in each sub-area may be transmitted to different peripheral devices.

Figure 5:
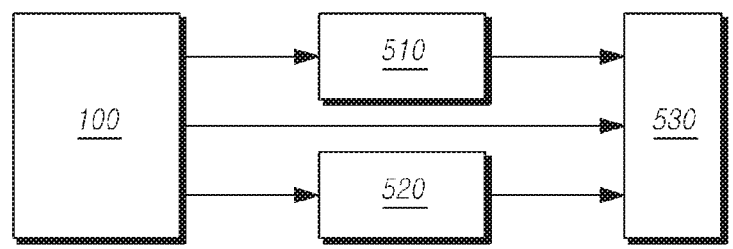
FIG. 5 is a diagram illustrating a flow of information of a camera device and peripheral devices according to an embodiment of the present invention.

FIG. 5 is a diagram illustrating a flow of information of a camera device and peripheral devices according to an embodiment of the present invention.

Referring to FIG. 5, a first control device 510, a second control device 520, and a third control device 530 may be mounted onto a vehicle.

In the vehicle, first information recognized in a first sub-area (e.g., the sub-area 212 of FIG. 2) may be transmitted to the first control device 510, second information recognized in a third sub-area (e.g., the sub-area 222 of FIG. 2) may be transmitted to the second control device 520, and third information recognized in a second sub-area (the sub-area 214 of FIG. 2) may be transmitted to the third control device 530. For example, a cruise control system may be mounted on the first control device 510, a cross traffic system may be mounted on the second control device 520, and a brake control system may be mounted on the third control device 530. In this instance, the first control device 510 may perform cruise control based on information associated with an obstacle located at a long distance, the second control device 520 may perform cross traffic control based on information associated with an obstacle located in a lateral direction, and the third control device 530 may perform braking control based on distance information associated with an obstacle that is close in the forward direction.

The camera device 100 generates a first image and a second image using two lenses 120 and 130, and the camera device 100 may measure the distance of a corresponding object using the two images (the first image and the second image) associated with the same object.

Figure 6:
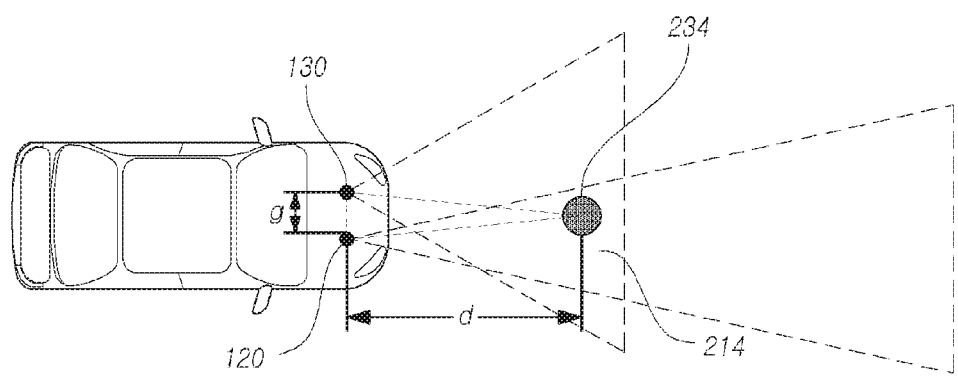
FIGS. 6 and 7 are diagrams illustrating an example of measuring a distance to an object using two lenses.
Figure 7:
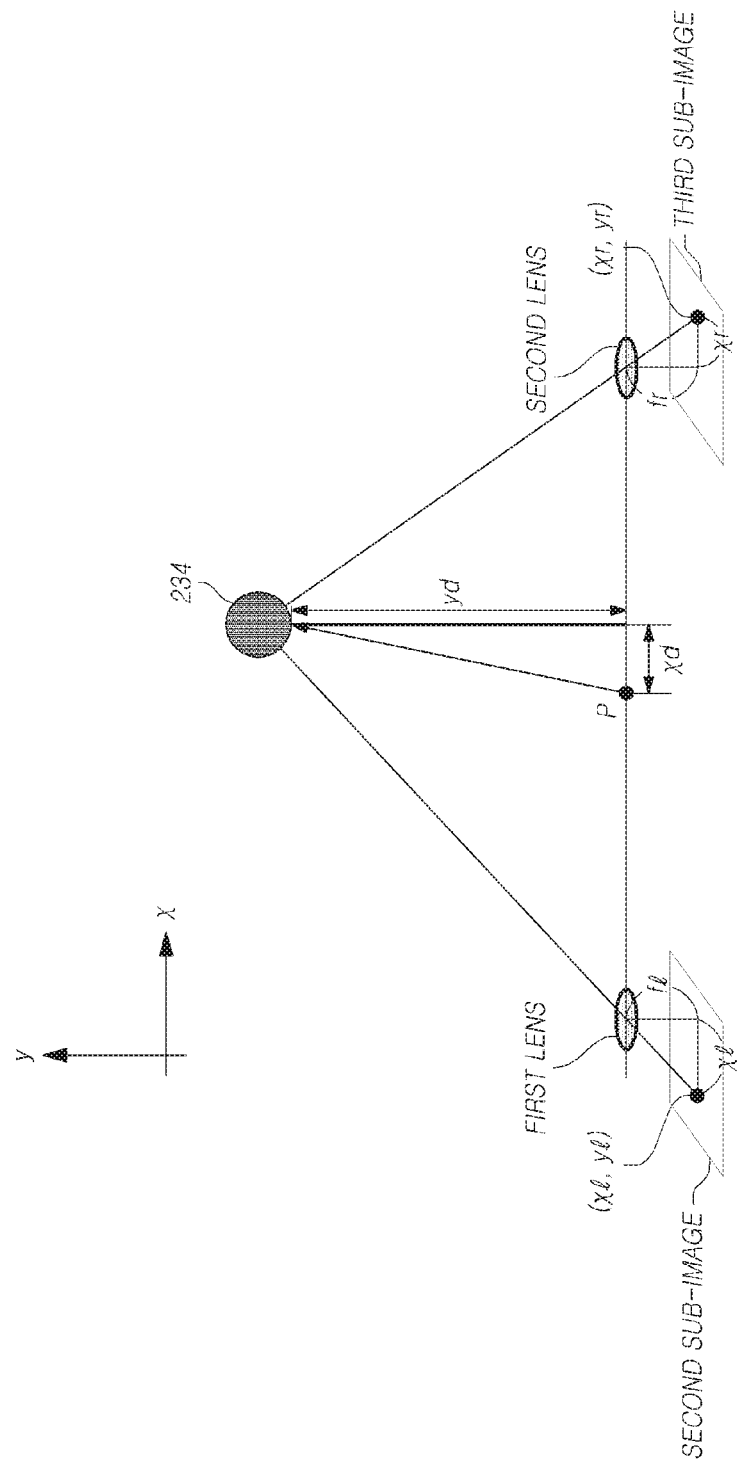

FIGS. 6 and 7 are diagrams illustrating an example of measuring a distance of an object using two lenses.

Referring to FIG. 6, the camera device 100 contains two lenses 120 and 130, which are spaced a predetermined gap (g) apart. By using the two lenses 120 and 130, the camera device 100 may generate two photographed images (a first image and a second image) associated with the second forward object 234 that is located in the second sub-area 214 and is a predetermined distance (d) distant from the vehicle.

The camera device 100 may measure the distance of the second forward object 234 by analyzing the first image and the second image. Particularly, the camera device 100 may analyze a second sub-image obtained by photographing the second sub-area 214 using the first lens 120, and a third sub-image obtained by photographing the second sub-area 214 using the second lens 130, may recognize the second forward object 234, and may measure the distance of the second forward object 234.

A method of measuring the distance of the second forward object 234 will be described with reference to FIG. 7.

Referring to FIG. 7, the second forward object 234 may be spaced xd in a first direction (x) and yd in a second direction, from the vehicle. The separation distance (d) of the second forward object 234 may be measured by calculating a distance (xd) spaced in the first direction (x) and a distance (yd) spaced in the second direction (y).

Herein, the first direction (x) separation distance (xd) may be expressed as a horizontal distance and the second direction (y) separation distance (yd) may be expressed as a vertical distance.

First, the second direction (y) separation distance (yd) may be calculated through the following equation, based on a difference between the first direction coordinate (xr) of the second forward object 234 in the second sub-image and the first direction coordinate (xl) of the second forward object 234 in the third sub-image.

$$y_d = \frac{g \times f}{(x_r - x_l)} \quad \text{[Equation 1]}$$

Here, f is a focal length.

In this instance, it is assumed that the coordinate of the first direction (x) and second direction (y) of the image of the second forward object 234 is (xr, yr) based on the center of the second sub-image generated through the first lens. It is assumed that the coordinate of the first direction (x) and the second direction (y) of the image of the second forward object 234 is (xl, yl) based on the center of the third sub-image generated through the second lens.

The focal length (fr) of the first lens 120 and the focal length (fl) of the second lens 130 are different, and thus, the camera device 100 may adjust the size or the resolution of at least one of the second sub-image and the third sub-image. Through the adjustment, the first direction coordinate (xr) of the second forward object 234 in the second sub-image or the first direction coordinate (xl) of the second forward object 234 in the third sub-image may be changed.

For example, when the size or the resolution of the second sub-image is adjusted by fl/fr based on the first direction coordinate (xl) of the second forward object 234 in the third sub-image, the first direction coordinate of the second forward object 234 in the second sub-image may be changed as follows.

$$x'_r = x_r \times \frac{f_l}{f_r} \quad \text{[Equation 2]}$$

xr' is the adjusted first direction coordinate of the second forward object 234 in the second sub-image.

Equation 1 may be corrected as below.

$$y_d = \frac{g \times f_l}{(x'_r - x_l)} \quad \text{[Equation 3]}$$

The first direction (x) separation distance (xd), which is the distance that the second forward object 234 is spaced in the first direction (x) from the central point (P) of two lenses, may be calculated as follows.

$$x_d = \frac{y_d \times x_l}{f_l} \quad \text{[Equation 4]}$$

That is, based on (xl, yl), which is the coordinate of the location of the image of the second forward object 234 in the third sub-image, the coordinate (xr, yr) of the image of the second forward object 234 in the second sub-image generated by the first lens may be adjusted to have an identical size. Based on the same, the vertical distance (yd) and the horizontal distance (xd) of the second forward object 234 from the central point of the first lens and the second lens may be calculated.

The camera device 100 may adjust at least one image out of the second sub-image and the third sub-image to have the same second direction coordinate.

Figure 8A:
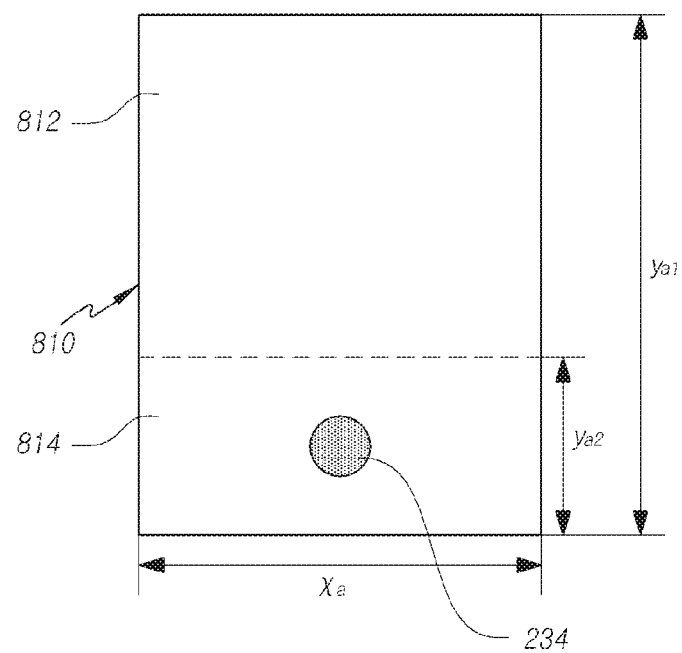
FIGS. 8A and 8B are diagrams illustrating a first image and a second image.
Figure 8B:
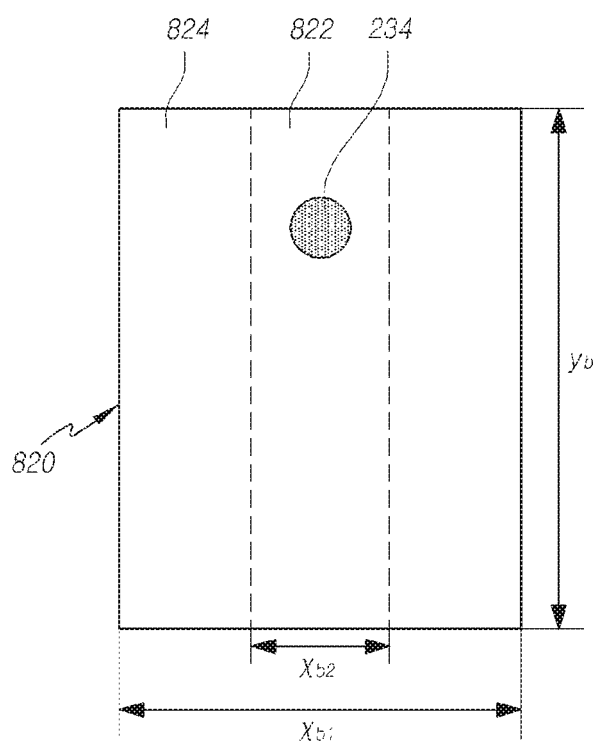

FIGS. 8A and 8B are diagrams illustrating a first image and a second image.

Referring to FIGS. 8A and 8B, a first image 810 may be formed of a first sub-image 812 and a second sub-image 814, and the second sub-image 814 may be located under the first sub-image 812. In this instance, the size of the first image 810 may be xa×ya1, and the size of the second sub-image 814 may be xa×ya2. A second image 820 is formed of a third sub-image 822 and a fourth sub-image 824, and the fourth sub-image 824 may be located in a lateral side of the third sub-image 822. In this instance, the size of the second image 820 may be xb1×yb, and the size of the third sub-image 822 may be xb2×yb.

The sizes of the second sub-image 814 and the third sub-image 822, which are obtained by photographing the same second forward object 234, may be different from each other. For example, the second sub-image 814 may have a short length in the y axis, and the third sub-image 822 may have a short length in the x axis.

The camera device 100 may adjust at least one image out of the second sub-image 814 and the third sub-image 822 associated with the second forward object 234 to have the same y-axis coordinate.

The second sub-image 814 and the third sub-image 822 are images obtained by photographing the same object, and thus, the camera device 100 recognizes the second forward object 234 by analyzing the second sub-image 814 and verifies the recognition of the second forward object 234 by analyzing the third sub-image 822; or recognizes the second forward object 234 by analyzing the third sub-image 822, and verifies the recognition of the second forward object 234 by analyzing the second sub-image 814.

Although the embodiment in which the camera device 100 includes two lenses 120 and 130 has been described, the present invention may not be limited thereto. The camera device 100 may include three or more lenses.

For example, the camera device 100 may further include a third image generating unit that generates a third image by photographing a third area through a third lens having a third angle of field and a third focal length. The camera device 100 may measure the distance of a third forward object that is located in a common area of the first area and the third area by analyzing the first image and the third image; or may measure the distance of a fourth forward object that is located in a common area of the second area and the third area by analyzing the second image and the third image.

Figure 9:
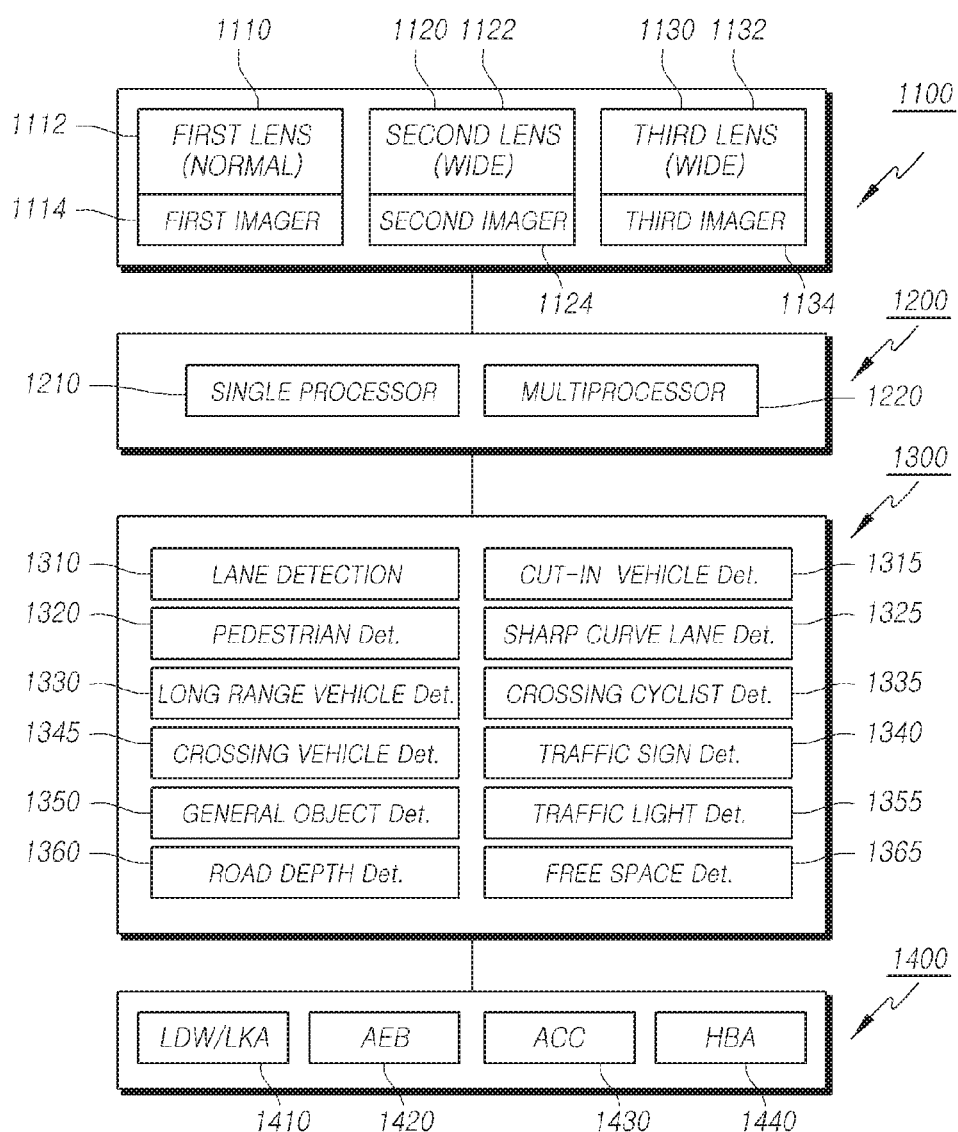
FIG. 9 is a diagram illustrating a configuration of a whole vehicle control system including a camera device according to the present invention.

FIG. 9 is a diagram illustrating a configuration of a whole vehicle control system including a camera device according to the present invention.

A whole vehicle control system includes: an imager module 1100 including three cameras that use three different lenses according to the present invention; an image processing module 1200 that processes an image obtained by the imager module; a detection module 1300 that detects an object or a vehicle existing on the outside using the result of processing performed by the image processing module; and a control module 1400 that controls an operating system of the vehicle using the result of detection performed by the detection module.

The imager module 1100 of FIG. 9 includes: a first camera unit 1110 that includes a first lens 1112 having a first angle of field which is the narrowest angle of field and a first focal length which is the longest focal length, and a first imager 1114 that obtains an image through the first lens; a second camera unit 1120 that includes a second lens 1122 having a second angle of field which is the widest angle of field and a second focal length which is the shortest focal length, and a second imager 1124 that obtains an image through the second lens; and a third camera unit 1130 that includes a third lens 1132 having a third angle of field which ranges between the first angle of field and the second angle of field and a third focal length which ranges between the first focal length and the second focal length, and a third imager 1134 that obtains an image through the third lens.

For ease of description, the first lens and the first camera unit may be expressed as a narrow lens and a narrow camera, the second lens and the second camera unit may be expressed as a wide lens and a wide camera, and the third lens and the third camera unit may be expressed as a normal lens and a normal camera.

As a matter of course, the camera unit may not be limited to a camera unit including three cameras, and the camera unit may be formed of only a narrow lens (camera) and a wide lens (camera).

The image processing module 1200 may include: a single processor 1210 that processes only data obtained from one of two or more cameras included in the imager module 1100 and a multiprocessor 1220 that processes, together, data obtained from two or more cameras.

The image processing module 1200 may selectively use a signal processing result of one of the single processor 1210 and the multiprocessor 1220, based on a type of detection operation of the detection module, which will be described below.

The detection module 1300 is to detect an object or a vehicle existing on the outside using the result of processing performed by the image processing module. Particularly, the detection module 1300 may include one or more out of: a lane detection unit 1310 that detects a lane of a road; a cut-in vehicle detection unit 1315 that detects a vehicle that cuts in front of an owner's vehicle; a pedestrian detection unit 1320 that detects a pedestrian around the vehicle; a sharp curve lane detection unit 1325 that detects a traffic lane having a sharp curvature that is less than or equal to a predetermined threshold radius curvature; a long range vehicle detection unit 1330 that detects another vehicle at a long distance; a crossing cyclist detection unit 1335 that detects a bicycle or a two-wheeled vehicle that cuts across a road in front of the owner's vehicle; a traffic sign detection unit 1340 that detects a traffic sign located around a traffic lane or located on a road; a crossing vehicle detection unit 1345 that detects another vehicle that cuts across a road in front of the owner's vehicle; a general object detection unit 1350 that detects a general object; a traffic light detection unit 1355 that detects a traffic light; a road depth detection unit 1360 that measures a depth of a forward road; and a free space detection unit 1365 that detects an empty space around the vehicle.

The control module 1400 is to control various operating systems of a vehicle using the detection result of the detection module. Particularly, the control module 1400 may be formed of a lane departure warning (LDW) and lane keeping assist (LKA) system 1410 that warns of a lane departure or performs control to keep a lane; an automatic emergency braking (AEB) control module 1420 that performs automatic emergency braking; an adaptive cruise control module 1430 that performs autonomous driving control, such as automatically following a forward vehicle or the like; and a head lamp control module (HBA) 1420 that controls the direction of a head lamp of a vehicle, or the like.

Each detection unit included in the detection module 1200 as described above may detect a required object based on the processing result obtained from the single processor 1210 or the multiprocessor 1220 included in the image processing module.

Particularly, in the similar manner as the descriptions of FIG. 4, during the normal driving along a road, the lane detection unit 1310 included in the detection module 1300 may detect a traffic lane based on images obtained from the first camera unit 1110 including a narrow lens or the third camera unit 1130 including a normal lens, and based on result data which is processed in the single processor 1210 corresponding thereto.

When the traffic lane that is detected during the above described lane detection process is changed to have a sharp curvature that is less than or equal to a predetermined threshold radius curvature, the traffic lane may not be detected based on the image obtained from the first camera unit 1110 including a narrow lens or the third camera unit 1130 including a normal lens. Accordingly, the sharp curve lane detection unit 1325 may operate in order to detect a sharp curvy lane based on an image obtained from the second camera unit 1120 including a wide lens.

The sharp curve lane detection unit 1325 may detect, for example, a traffic lane of a road (e.g., a road at an expressway ramp) having a radius curvature that is less than or equal to about 125 m.

Figure 10A:
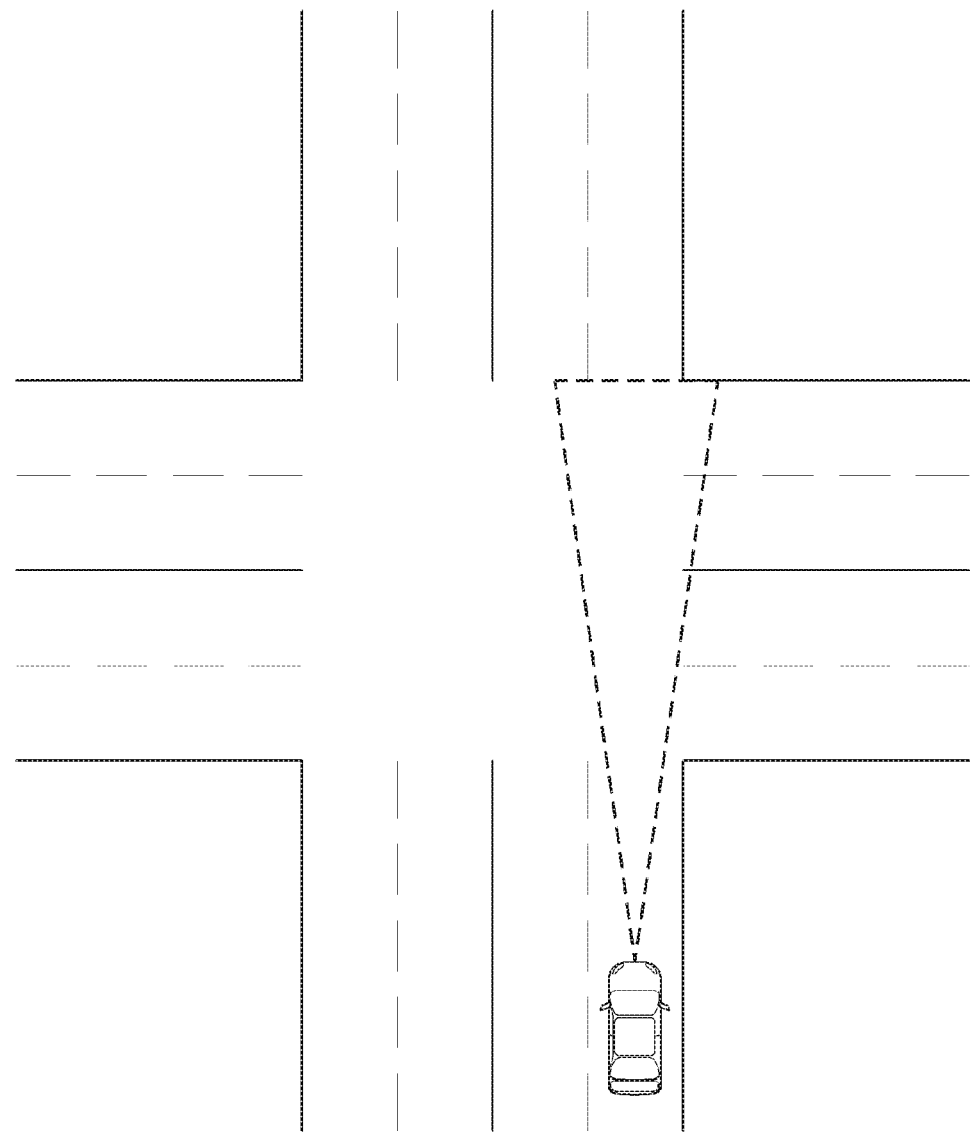
FIGS. 10A to 10F are diagrams illustrating various examples of a method of detecting an object and a vehicle existing around a vehicle using the camera device of FIG. 9.

FIG. 10A illustrates operations of a camera device and a detection module of the present invention at a crossroad area.

As illustrated in FIG. 10A, a plurality of lanes for guiding vehicles at the crossroad area may be required, and thus, some of the straight lanes may be disconnected.

In this instance, in the case in which a conventional lane detection function that uses a single camera is only employed, when a vehicle enters the crossroad area, the vehicle unexpectedly fails to recognize a straight lane and the vehicle may be incorrectly controlled.

Also, steering and braking control of the vehicle based on a traffic lane, a forward running vehicle, or a traffic light may be needed at the crossroad area. At the crossroad area, the vehicle may need to recognize various objects (bicycle, another vehicle, or the like) that cut across a road in front of the owner's vehicle, and may perform additional control thereon.

Also, in the case in which the vehicle turns right at the crossroad area, as a pedestrian at the crosswalk along the right side is detected, controlling thereon may be additionally performed.

However, the existing forward camera device that uses a single camera may have difficulty in sufficiently supporting various types of controlling required at the crossroad area, as described above.

Therefore, the present invention performs a detailed control at the crossroad area using a camera unit including two or more angles of field, as follows.

Figure 10B:
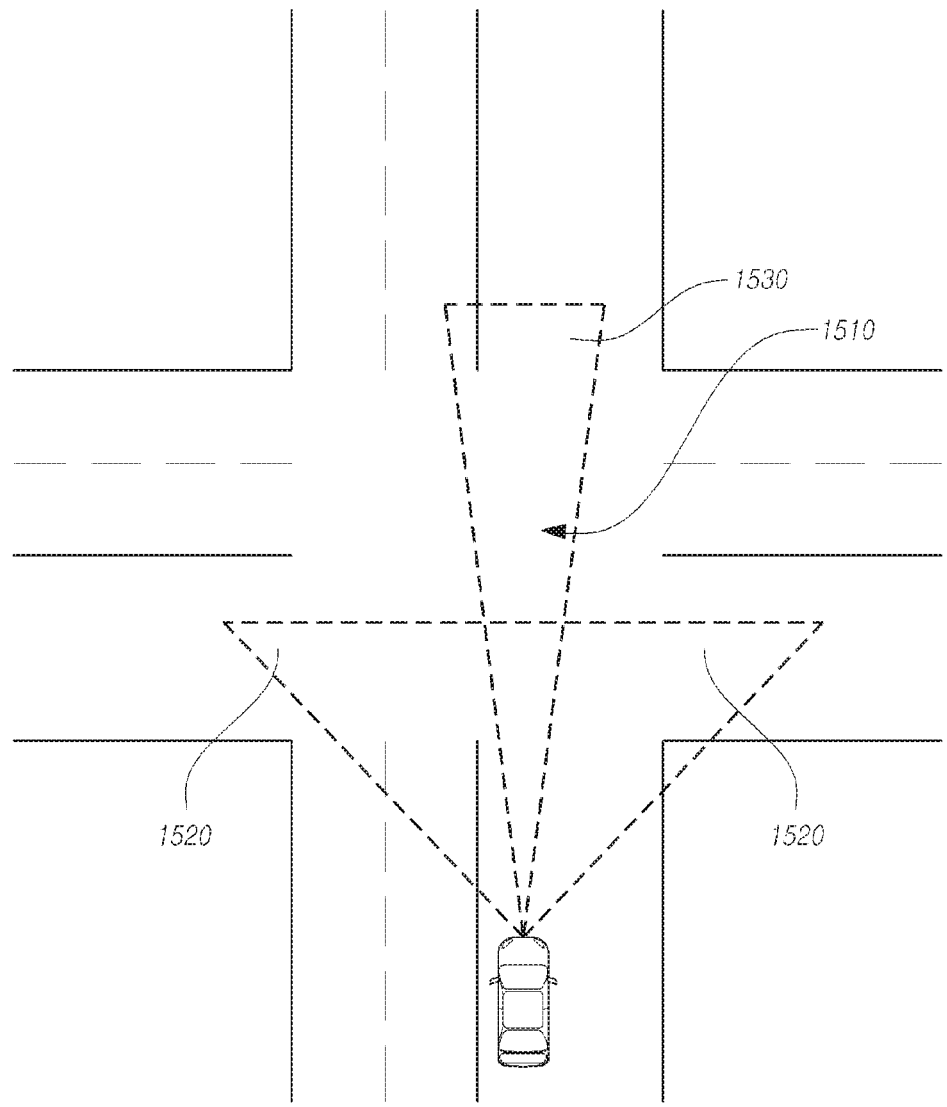

FIG. 10B illustrates a traffic lane detecting scheme at a crossroad according to the present invention.

According to the present invention, in the case in which the lane detection module 1310 of the detection module 1300 detects a traffic lane using a first camera unit that includes a narrow lens or a third camera unit that includes a normal lens, and detects that the detected lane is not recognized during at least a predetermined distance or detects that the detected lane is disconnected during at least a predetermined distance, the detection module 1300 may determine the corresponding lane part 1510 as a crossroad area.

When the corresponding lane part 1510 is determined as the crossroad area, the lane detection module 1310 drives the second camera unit including a wide lens and obtains a wide image, and thus, may recognize a right-and-left crossing lane 1520 that extends to the right and to the left. Additionally, the lane detection module 1310 may detect a long-distance lane 1530 that extends in a beeline after the crossroad area using the first camera unit including a narrow lens.

Therefore, according to the present invention, as the vehicle enters the crossroad, the right-and-left crossing lane 1520 and the long-distance lane 1530 that extends in a beeline after the crossroad area may be additionally recognized. Therefore, erroneous lane detection at the crossroad area and abnormal vehicle controlling based thereon may be overcome.

Figure 10C:
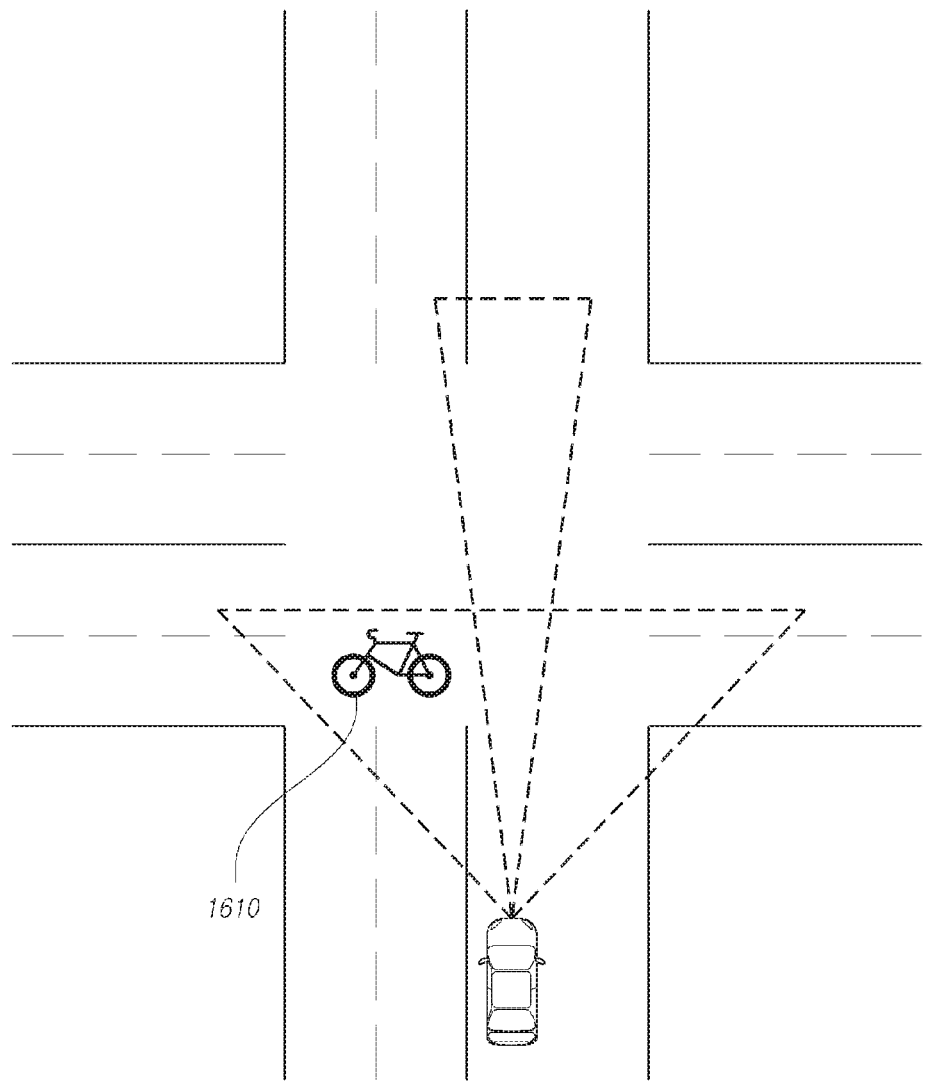

FIG. 10C illustrates a crossing vehicle or crossing cyclist detection scheme at a crossroad area.

As illustrated in FIG. 10B, when it is determined, through the detection module 1300, that a vehicle enters a crossroad area, a crossing cyclist detection unit 1335 or a crossing vehicle detection unit 1345 may detect a bicycle or another vehicle that cuts across a road in front of the vehicle and moves by using an image obtained from a second camera unit including a wide lens.

In this instance, a long range vehicle detection unit 1330 may detect another vehicle existing at a long distance from the owner's vehicle using a first camera unit including a narrow lens and the single processor 1210 corresponding thereto, and simultaneously, the crossing cyclist detection unit 1335 or the crossing vehicle detection unit 1345 may additionally detect a bicycle (a two-wheeled vehicle 1610) or another vehicle that cuts across a road in front of the owner's vehicle at a crossroad area, by using the second camera unit including a wide lens and a single processor 1210 corresponding thereto.

As a matter of course, in this instance, to simultaneously process images obtained from the first camera unit (or the third camera unit) and the second camera unit, the multi-processor 1220 included in the image processing module 1200 may be used.

In this instance, the crossing cyclist detection unit 1335 or the crossing vehicle detection unit 1345 may detect a blob of an object from the image obtained from the second camera unit including a wide lens, and may determine whether two similar circular patterns are detected from the inside of the blob.

When two similar circular patterns are detected from the inside of the same blob, the object may be recognized as a crossing vehicle or a crossing bicycle.

By employing the above described architecture, a forward vehicle, a vehicle that cuts across a road in front of the owner's vehicle, or bicycle may be detected. Accordingly, an automatic emergency braking controller 1420 or the like, which will be described below, may be controlled, and thus, an accident that may occur at a crossroad area may be avoided.

Figure 10D:
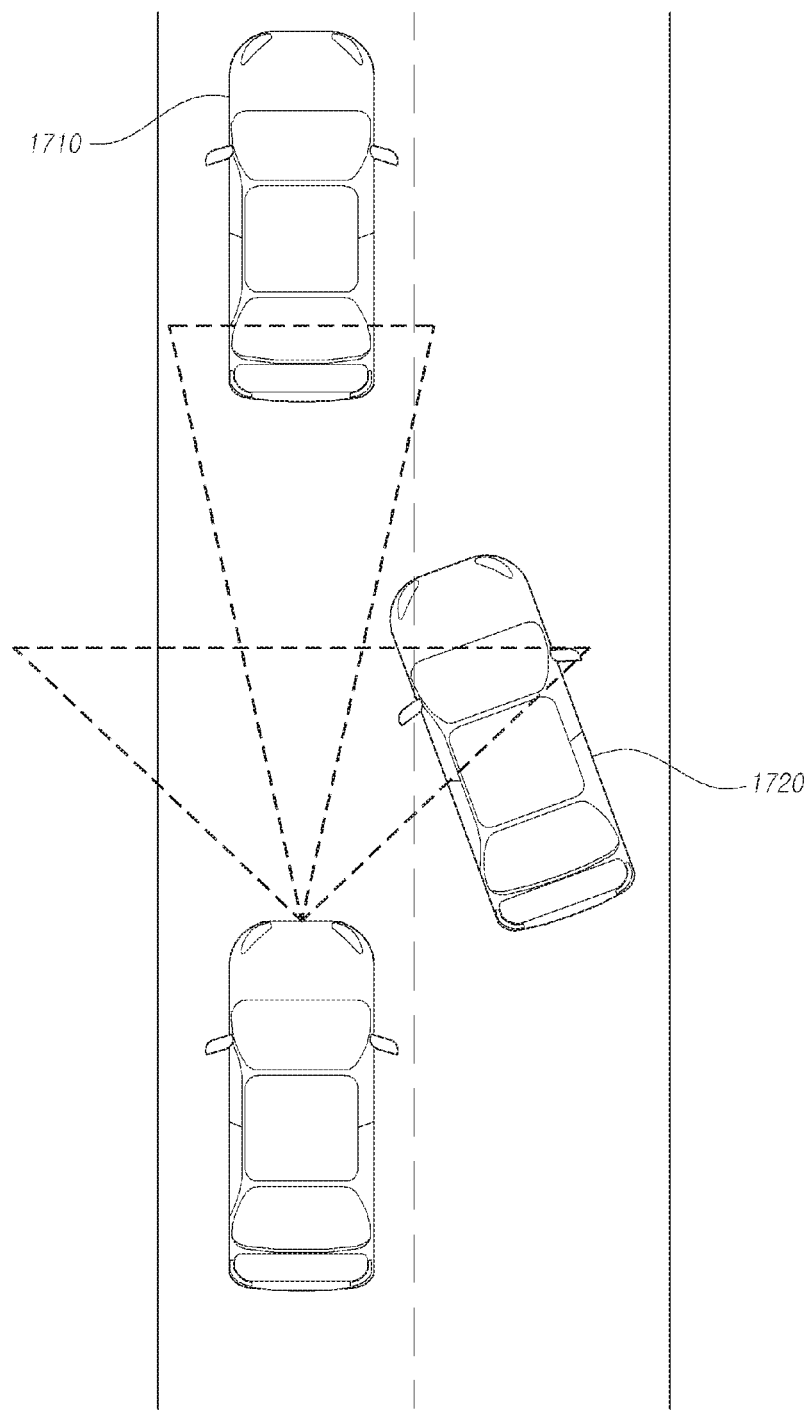

FIG. 10D illustrates an example of detecting a cut-in vehicle that horizontally cuts in the owner's vehicle up ahead.

The long range vehicle detection unit 1330 detects a first vehicle 1710 existing at a long distance in the forward direction from the owner's vehicle using a first camera unit including a narrow lens and the single processor 1210 corresponding thereto, and simultaneously, the cut-in vehicle detection unit 1315 may receive result data from a second camera unit including a wide lens (second lens) and a processor corresponding thereto, and may detect a second vehicle 1720 that cuts in front of the owner's vehicle.

Figure 10E:
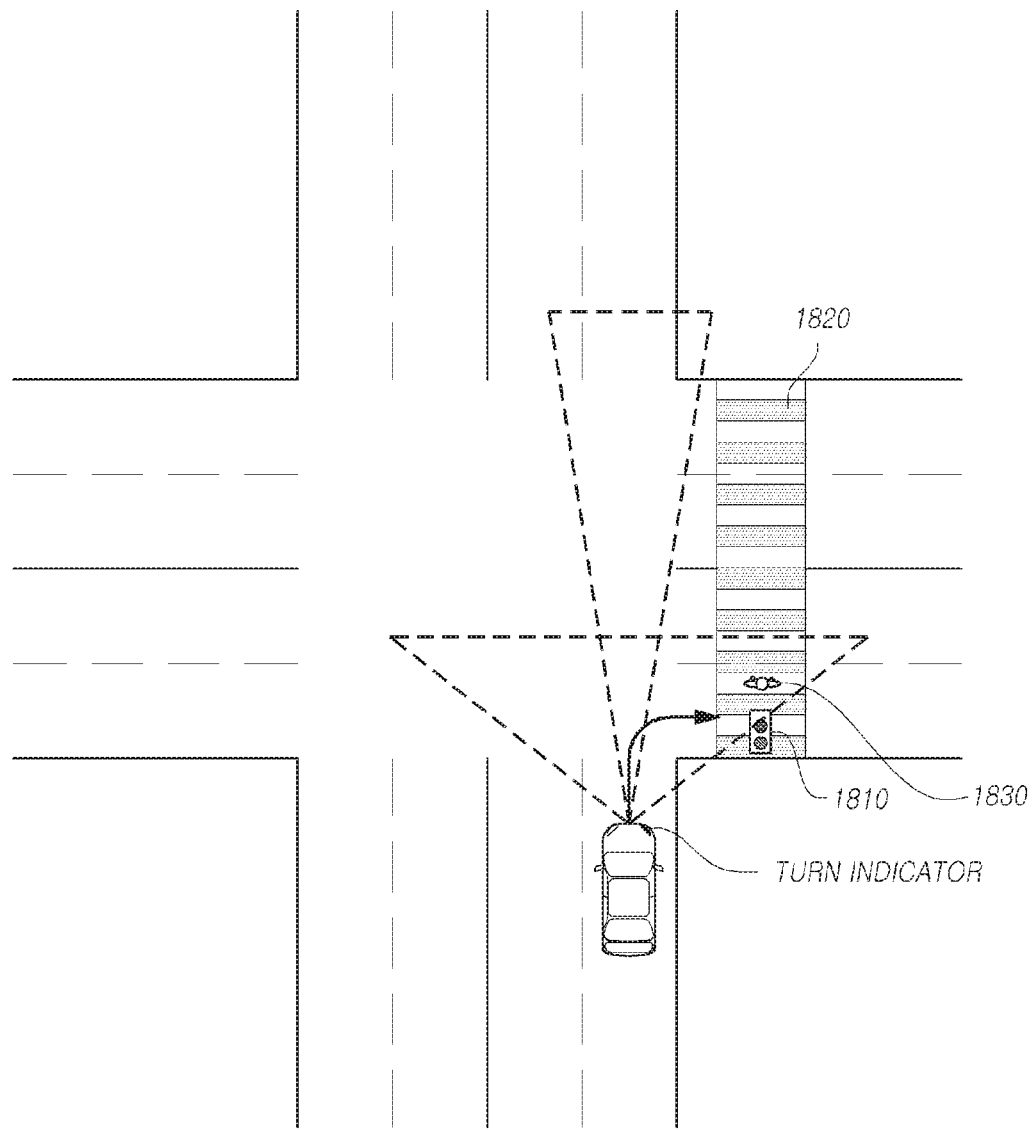

FIG. 10E illustrates an architecture of detecting a crosswalk, a crosswalk traffic light, a pedestrian, and the like, which are located in a turn lane at a crossroad.

As illustrated in FIG. 10B, when it is determined, through the detection module 1300, that a vehicle enters a crossroad area, and whether the vehicle makes a left turn/right turn based on the activation state of a turn indicator of the vehicle, the traffic light detection unit 1355 may recognize a crosswalk traffic light 1810 existing in the movement direction (left turn or right turn) of the vehicle by using an image obtained from a second camera unit including a wide lens.

That is, when it is determined that the vehicle enters the crossroad and the right turn indicator of the vehicle is turned on, the traffic light detection unit 1355 may be activated and may determine the state of a crosswalk traffic light existing in the course along the right side by using the image obtained from the second camera unit including a wide lens.

In this instance, when the crosswalk traffic light existing in the course along the right side is green, the control module 1400 may control the automatic emergency braking controller 1420 or the like so as to stop the vehicle.

Also, when it is determined that the vehicle enters the crossroad and the right turn indicator of the vehicle is turned on, the traffic sign detection unit 1340 may be activated and may recognize a crosswalk mark 1820 existing in the course along the right side by using the image obtained from the second camera unit including a wide lens.

Also, together with the recognition of the crosswalk, the pedestrian detection unit 1320 may distinguish a pedestrian 1830 existing on or around the crosswalk by using the image obtained from the second camera unit including a wide lens.

In this instance, a detailed vehicle control scheme may be configured as follows.

First, when the traffic signal detection unit 1340 detects the crosswalk existing in the course along the right side of the crossroad by using a second camera unit with a wide lens, the pedestrian detection unit 1320 sets a pedestrian detection sensitivity to be high, and increases a brake pressure for automatic emergency braking so that emergency braking is possible when a pedestrian appears.

In this instance, when the pedestrian detection unit 1320 detects a pedestrian, the automatic emergency braking controller 1420 of the control module may perform emergency braking of the vehicle.

As described above, in a crossroad area, at least one out of a crosswalk, a crosswalk traffic light, and a pedestrian which exist on a course along a turn lane may be detected by using an image obtained from a camera unit with a wide lens. Accordingly, a vehicle or a steering system may be controlled based thereon, and an accident that may occur at the crossroad may be avoided.

When a crosswalk traffic light is recognized as illustrated in FIG. 10E, a forward traffic light may be simultaneously detected using a first or third camera unit including a narrow lens or a normal lens. Based thereon, the function of detecting a crosswalk traffic light or a crosswalk existing in a course along the right side may be improved.

For example, in the case in which the traffic light detection unit 1355 detects a forward traffic light using the first or third camera unit including a narrow lens or a normal lens, only when the result of the detection is a green light, a crosswalk traffic light or a crosswalk on the course along the right side may be detected using an image of a second camera unit with a wide lens.

Figure 10F:
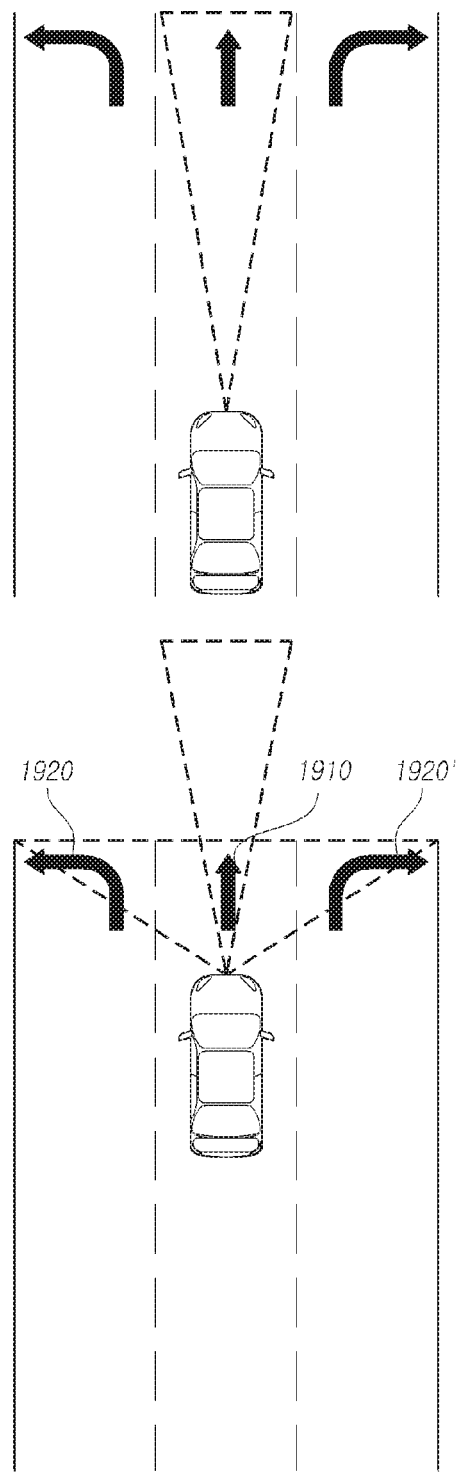

FIG. 10F illustrates an example in which the traffic sign detection unit 1340 recognizes a road marking using images of a plurality of camera units.

As illustrated in FIG. 10F, the traffic sign detection unit 1340 may detect a road marking, such as a direction indicating mark existing on a road in front of a vehicle, by using a first or third camera unit including a narrow lens or a normal lens.

In this instance, the first or third camera unit including the narrow lens or the normal lens has a narrow angle of field, and thus, may detect only a direction indicating mark included in a single lane, which is a limitation.

Therefore, when the traffic sign detection unit 1340 detects a direction indicating mark 1910 existing on a running road in front of the vehicle by using the first or third camera unit including a narrow lens or a normal lens, the traffic sign detection unit 1340 may additionally recognize a direction indicating mark 1920 and 1920' existing on the left and right lanes of a running lane using an image obtained from the second camera unit with a wide lens, at the same time of the detection, or at a predetermined period of time thereafter.

Through the above, the validity of the detection of the direction indicating mark on the running lane, which is performed through the first or third camera units including a narrow lens or normal lens, may be determined.

For example, in the state in which the direction indicating mark 1910 on the running lane, which is detected using the first or third camera unit including the narrow lens or normal lens, indicates go-straight, when a direction indicating mark on the right lane, which is detected by using the second camera unit with a wide lens indicates turn-left, it is determined that the direction indicating mark 1910 on the running road, which is detected by using the first or third camera unit including a narrow lens or a normal lens, has an error.

Also, when a road marking existing on a running lane and an adjacent lane is exactly recognized using a plurality of cameras, as described above, the performance of automatic driving of an autonomous vehicle may be improved.

For example, when it is determined that the vehicle is going to make a left turn based on route information for automatic driving, which is received from a navigation or the like, and when a direction indicating mark existing on a running lane or an adjacent lane is detected using a plurality of cameras, as described above, a point in time when to change a traffic lane of a vehicle may be optimized based thereon.

As described above, according to the present invention, the camera device 100 may obtain at least two images of which photographed areas are different, and the object recognition area of a system that uses an image photographed by a camera may become wide.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A camera device of a vehicle, the camera device comprising:
an imager module that includes two or more cameras, each camera including a first lens and a second lens having different angles of field and different focal lengths each other,
wherein the imager module includes:
a first camera that includes a first lens, which has a first angle of field and a first focal length, and a first imager that obtains an first image through the first lens; and
a second camera that includes a second lens, which has a second angle of field that is wider than the first angle of field and a second focal length that is shorter than the first focal length, and a second imager that obtains an second image through the second lens;
an image processing module that processes the first and second images that are obtained from the first camera and the second camera the imager module; and
a detector that detects an object or a vehicle existing on the outside by using a result of processing for analyzing the first image and the second image performed by the image processing module, in a manner of
recognizing a first forward object or a first forward vehicle existing in the first image,
recognizing a lateral object or a lateral vehicle existing in the second image, and
recognizing a second forward object or a second forward vehicle existing in a common area between the first image and the second image,
wherein the detector performs at least one of:
a lane detection operation that detects a traffic lane of a road;
a cut-in vehicle detection operation that detects a vehicle that cuts in front of the owner's vehicle;
a pedestrian detection operation that detects a pedestrian around the vehicle;
a sharp curve lane detection operation that detects a traffic lane of which a curvature is less than or equal to a predetermined threshold radius curvature;
a long range vehicle detection operation that detects another vehicle at a long distance;
a crossing cyclist detection operation that detects a bicycle or a two-wheeled vehicle that cuts across a road in front of the owner's vehicle;
a traffic sign detection operation that detects a traffic sign located around a traffic lane or existing on a road;
a crossing vehicle detection operation that detects another vehicle that cuts across a road in front of the owner's vehicle;
a general object detection operation that detects a general object;
a traffic light detection operation that detects a traffic light;
a road depth detection operation that measures a depth of a forward road;
a free space detection operation that detects an empty space around the vehicle.

2. The camera device of claim 1, wherein the image processing module includes: a single processor that processes only data obtained from one of two cameras included in the imager module; and a multi-processor that processes, together, data obtained from all of the two cameras.

3. The camera device of claim 1, wherein the imager module further includes:
a third camera that includes: a third lens having a third angle of field that ranges between the first angle of field and the second angle of field, and having a third focal length that ranges between the first focal length and the second focal length; and a third imager that obtains an image through the third lens.

4. The camera device of claim 1, wherein, when a traffic lane detected by the lane detection operation based on an image that is obtained through the first camera has a radius curvature that is less than or equal to a predetermined threshold radius curvature, the sharp curve lane detection operation of the detector includes detecting a traffic lane using an image obtained from the second camera.

5. The camera device of claim 1, wherein, when the detector configured to perform the lane detection operation detects a traffic lane using the first camera and detects that the detected traffic lane is not recognized during at least a predetermined distance, or detects that the detected traffic lane is disconnected during at least a predetermined distance, the lane detection operation includes determining the corresponding part as a crossroad area; and
when the corresponding part is determined as the crossroad area, the lane detection operation further includes recognizing a right-and-left crossing lane that extends to the right and to the left at the crossroad, from an image obtained from the second camera.

6. The camera device of claim 5, wherein the lane detection operation further includes detecting a long-distance lane that extends in a forward area beyond the crossroad area by using an image obtained from the first camera.

7. The camera device of claim 1, wherein, when the detector configured to perform the lane detection operation detects a traffic lane using the first camera and detects that the detected traffic lane is not recognized during at least a predetermined distance, or detects that the detected traffic lane is disconnected during at least a predetermined distance, the lane detection operation includes determining the corresponding part as a crossroad area; and
when the corresponding part is determined as the crossroad area, the crossing cyclist detection operation or crossing vehicle detection operation includes detecting a bicycle or another vehicle that cuts across a road in front of the owner's vehicle using an image obtained from the second camera.

8. The camera device of claim 1, wherein, when it is determined that the vehicle enters the crossroad, and a right turn indicator of the vehicle is turned on, the traffic sign detection operation includes detecting a crosswalk mark existing in a course along the right side by using an image obtained from the second camera; or
the traffic light detection operation includes determining a state of a crosswalk traffic light existing in the course along the right side by using the image obtained from the second camera.

9. The camera device of claim 8, wherein the pedestrian detection operation further includes distinguishing a pedestrian existing on or around the crosswalk by using the image obtained from the second camera that includes a wide lens.

10. The camera device of claim 9, wherein, when the detector configured to perform the traffic sign detection operation detects a crosswalk mark existing in the course along the right side using the image obtained from the second camera, the camera device sets a pedestrian detection sensitivity for the pedestrian detection operation to be high, and increases a brake pressure for automatic emergency braking.

11. The camera device of claim 1, wherein, when the detector configured to perform the traffic sign detection operation detects a direction indicating mark that exists on a running road in front of the vehicle by using the first camera, the camera device further recognizes a direction indicating mark existing in the right and left lanes of a running lane by using an image from the second camera, at the same time of the detection or a predetermined period of time thereafter.

* * * * *